United States Patent Office 2,921,768
Patented Jan. 19, 1960

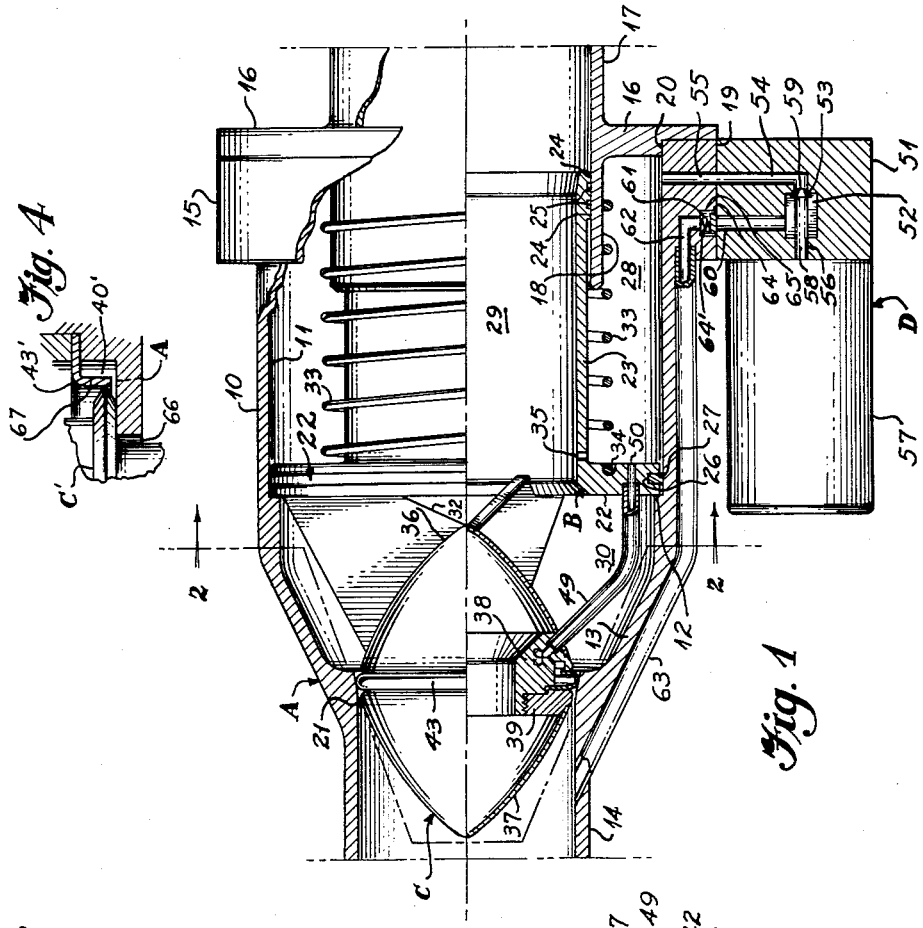

2,921,768

DIFFERENTIAL PRESSURE ENERGIZED PILOT VALVE CONTROLLED SHUT-OFF VALVE WITH FLUID PRESSURE ACTUATOR SEAL

Norman D. Blackburn, San Fernando, Calif., assignor to Actuation Research Corporation, Glendale, Calif.

Application May 28, 1957, Serial No. 662,205

9 Claims. (Cl. 251—30)

This invention relates to shut-off valves for pressure fluid transmitting lines and has as its general object to provide an improved valve having differential fluid pressure responsive means for actuating the same both in the opening and the closing direction, under the control of a pilot valve. A particular object of the invention is to provide such a valve which utilizes fluid pressure differentials not only for moving the valve between opened and closed positions but also for energizing a sealing device to effect a tight seal between the movable valve head and the valve seat.

Another object is to provide an improved arrangement of parts in a fluid pressure operated valve wherein a differential pressure responsive valve actuating piston is of annular form and is arranged in encircling relation to a flow passage which extends in a straight line through the valve between coaxial inlet and outlet connections. Another object is to provide such a valve wherein a valve closing fluid pressure chamber is defined in annular form, encircling said flow passage, the annular piston being provided with an axially extend sleeve which is in sliding telescoping relation with the valve inlet and which defines the inner wall of said annular valve closing chamber. A further object is to provide such a valve wherein a movable valve head is rigidly connected to the aforesaid annular piston by axially extending struts whereby the valve head is in axially spaced relation to the piston and wherein an annular valve opening chamber is disposed between the downstream side of the piston and the valve outlet, said valve opening chamber constituting an extension of the flow passage in the piston sleeve and expanding around the valve head to communicate with the outlet.

Another object of the invention is to provide an improved arrangement of the aforesaid assembly of piston and valve head, together with a fluid pressure energized seal which is of toroidal form, defines the periphery of the valve head and seats against a valve seat in the form of a throat at the beginning of the valve outlet.

A further object is to provide a fluid pressure operated valve of the type outlined above, wherein the expansion of the fluid pressure energized seal is effected by an increase in fluid pressure in the valve closing chamber when the piston reaches the end of its valve closing movement and the valve head reaches the valve closing position.

A further object is to provide such a valve having an improved arrangement of solenoid operated pilot valve for controlling the pressure differential across the valve operating piston in a manner to utilize fluid pressure to either open or close the valve at will. More specifically, the invention contemplates an improved arrangement wherein a pilot valve controls the escape of fluid pressure from the valve closing chamber so that by discharging the pressure therefrom, the pressure differential normally acting in the valve closing direction may be reversed to establish a pressure differential in the valve opening chamber, thus effecting the opening of the shut-off valve when the pilot valve is opened and the closing of the shut-off valve when the pilot valve is closed.

Other objects will become apparent in the ensuing specifications and appended drawing, in which:

Fig. 1 is a view, partially in side elevation and partially in axial section of a valve embodying my invention;

Fig. 2 is a transverse sectional view of the same, taken on the line 2—2 of Fig. 1;

Fig. 3 is an enlarged detailed sectional view of the fluid pressure energized seal; and Fig. 4 is a detailed sectional view of a modified form of the fluid pressure energized seal.

Referring now to the drawings in detail, I have shown therein, as an example of one form in which the invention may be embodied, a shut-off valve which, in general, embodies a valve housing indicated generally at A, a valve actuating piston unit B therein, a movable valve head C, carried by the piston unit B, and a pilot valve unit D which controls the fluid pressure responsive opening and closing of the valve.

The housing unit A comprises a cylinder 10 having a cylindrical bore 11 terminating at an annular shoulder 12, a downstream end member 13 in the form of a frusto conical neck tapering down to the diameter of an outlet 14, a radial flange 15 at the upstream end of the cylinder 10, and an upstream end member 16 in the form of an annular cap secured to the flange 15 by any conventional means such as cap screws (not shown). Former integrally with cap 16 is an inlet 17 which may be connected in any suitable manner to a section of fluid line delivering fluid to the valve under pressure, the outlet 14 being similarly connected to another section of the fluid line, to receive the fluid passing through the valve. A cylindrical skirt 18, preferably of the same diameter as the inlet 17, is formed integrally with and extends axially from the cap 16 into the space within cylinder 10, in radially inwardly spaced relation to the bore 11. At one side of the cylinder 10 is a boss 19 to which the pilot valve unit D is mounted. The cap 16 is preferably provided with a locating shoulder 20, snugly received in the end of bore 11, or other equivalent means to accurately locate the skirt 18 in concentric relation to the cylinder 10. Where the downstream end member 13 joins the outlet 14, it is provided with a throat 21 of approximately cylindrical form but having a slight frusto conical flare toward the cylinder 10 to constitute a valve seat into which the valve head C may freely move immediately preceding the seating of the valve head against the seat 21.

The piston unit B comprises an annular piston 22 formed integrally with and projecting radially outwardly from the downstream end of a cylindrical sleeve 23 which is telescopically received within skirt 18 for axially sliding movement therein. The upstream end of sleeve 23 is provided with several integral circumferential sealing lands 24 fitted snugly to the cylindrical bore of skirt 18 to provide a fluid seal. Lands 24 are separated by circumferential grooves 25 for retaining a lubricating oil or other sealing medium. In the periphery of piston 22 is an annular groove 26 in which is mounted a sealing gasket 27 in fluid sealing engagement with the bore 11 of cylinder 10. An annular valve closing fluid pressure chamber 28 is defined between end member 16 and piston 22 on the upstream side of the latter, within cylinder 10 and in circumscribing relation to the skirt 18 and sleeve 23. A flow passage 29 is defined interiorly of sleeve 23, as an in-line continuation of the fluid passage defined by inlet 17. A valve opening fluid pressure chamber 30 is defined between the downstream side of piston 22 and the downstream end member 13. Chamber 30 communicates with flow passage 29 in the area between piston unit B and valve head C, which is in axially spaced relation to the piston unit. The pressure chamber 30 constitutes a continuation of the flow passage 29 up to the outlet throat 21. Attached to the piston 22 and projecting axially therefrom in converging array are several bracket struts 32 to which the valve head B is mounted. The valve head may be attached to the ends of struts 32 by any suitable means such as brazing or spot welding. Encircling the sleeve 23 and skirt 18 is a light coil spring 33 one end of which is positioned in an annular face groove 34 in piston 22 and the other end of which abuts against the upstream end cap 16. Spring 33 functions to close the valve when no fluid pressure differential is being exerted on piston 22. This makes it possible for valve operating fluid pressure differential to be established when fluid flow commences in the fluid line. In the sleeve 23 is a bleed port 35, through which fluid under pressure may slowly bleed from the flow passage 29 into the valve closing chamber 28. When escape of fluid from chamber 28 is cut off, this will result in the fluid pressurized closing of the valve.

The valve head C is of faired contour, preferably of ovoid form as shown, to minimize its drag effect in the air stream flowing through the valve. It comprises a nose section 36 and tail section 37 in the form of lightweight shells of sheet metal or other suitable sheet material in cup form; and a pair of mounting rings 38, 39 respectively, to which the respective sections 36 and 37 are attached as by spot welding or brazing the peripheral portions thereof over portions of the rings 38 and 39 which are received therein.

The peripheral portions of rings 38 and 39 are spaced axially from one another to define an annular peripheral recess 40 which is of L-section, the ring 38 having a shoulder portion 41 overhanging an inner leg 42 of the recess 40. Mounted in the annular recess 40 and constituting the periphery of the valve head C is a toroidal, hollow inflatable seal 43 of bellows form (corresponding to one external corrugation of a bellows). On one side seal 43 has a wall 44 in the form of a flat ring the inner end of which is clamped between the rings 38 and 39 and is anchored by a short axial flange 45 which is received in a shallow cylindrical recess defined between the rings 38 and 39. The opposite wall of seal 43 is in radially slidable bearing engagement with the shoulder 41 of ring 38 and has at its inner margin an axially projecting shallow flange 46 which extends into recess leg 42 and is hooked beneath the shoulder 41 to contain the seal 43 against "blowing out" when fluid pressure is applied thereto. Normally the flange 46 is spaced radially inwardly from shoulder member 41 to provide clearance for expansion of the seal 43 radially outwardly into tight sealing engagement with the throat 21 when the seal is inflated by fluid pressure.

An L-shaped port 47 is formed in ring 38 in communication with the recess 40. A fluid pressure transfer tube 49 of elbow form has one end mounted in ring 38 and connected to port 47, its other end being mounted in piston 22 and connected to a port 50 extending through the piston and communicating with the valve closing fluid pressure chamber 28.

The pilot valve unit D comprises a pilot valve casing 51 which is securely mounted and sealed to boss 19 by any suitable conventional means (not shown). Formed within casing 51 is a pilot valve chamber 52 at one end of which is a seat 53 communicating with a pilot valve inlet passage 54. Passage 54 extends through the side of valve casing 51 that is mounted to boss 19 and communicates with a pressure port 55 extending through the cylinder 10 to the face of boss 19 from the valve closing fluid pressure chamber 28. The casing 51 has a bore 56 extending from the end of chamber 52 opposite valve seat 53 to a face of casing 51 to which is attached a solenoid 57 of conventional construction. To the armature (not shown) of solenoid 57 is attached a valve stem 58 which extends through bore 56 and through chamber 52 and, at its end, carries a pilot valve poppet 59 in position to seat against the pilot valve seat 53. Extending from the side of pilot valve chamber 52 to the face of casing 51 which is mounted to the boss 19, is a pilot outlet passage 60. Formed in the boss 19, in coaxial communication with the outer end of outlet passage 60 is a check valve chamber 61 and an L-shaped port 62 extending therefrom to a lateral face of boss 19 facing toward outlet 14. Port 62 forms a portion of a discharge passage which is continued by a discharge tube 63 attached to the outer wall of housing A and fitted to the longitudinal contour thereof, one end of tube 63 extending into boss 19 and communicating with port 62 and the other end of tube 63 extending through the wall of outlet 14 and communicating with the outlet passage therein. A lightweight check valve disc 64 is mounted in the chamber 61 and is adapted to seat against a valve seat defined by an annular area of the face of valve casing 51 which is attached to boss 19, said annular area being defined between the port 60 and the larger diameter of chamber 61. A light coil spring 64' may be interposed between the valve disc 64 and the shoulder defined between chamber 61 and passage 62 to prevent the seating of the valve disc 64 against the said shoulder. Thus the valve is a one way valve and does not interfere with flow in the direction of escape toward the outlet 14.

In the operation of the invention, when the pilot valve is open, fluid may escape from the valve closing fluid pressure chamber 28 through the port 55, the passage 54, the pilot valve, the passage 60, port 62 and discharge tube 63 to the downstream side of valve C. A pressure differential corresponding to the pressure drop across the valve from inlet 17 to outlet 14 is thus applied to the piston 22 in the valve opening direction, the pressure on the downstream side of the piston being the high upstream pressure of inlet 17 and the pressure on the upstream side of the piston being the low downstream pressure of outlet 14. This pressure differential is sufficient to overcome the light resistance of spring 33 and to open the valve. The degree of valve opening will be proportional to the pressure drop across the valve which tends to build up in accordance with the volume of flow in the line, and thus as the flow volume increases the degree of valve opening will correspondingly increase. In this connection it may be noted that the spring 33 is a positive rate spring the loading of which increases somewhat as it is compressed.

Whenever it is desired to shut off the valve and arrest the flow of fluid while a pressure head continues to be applied to the inlet 17, the solenoid D is energized and this will effect the projection of pilot valve 59 to its closed position against seat 53, cutting off the escape of fluid from the pressure chamber 28 and causing the pressure in that chamber to build up as the fluid bleeds into the chamber through port 35, until the pressure in the chamber, added to the loading of spring 33, overcomes the pressure differential previously acting on piston 22 in the valve opening direction. The valve will then close and as it approaches its seat, the flow of fluid will be choked off and the pressure in chamber 28 will increase toward the value of the full pressure head applied to inlet 17 by the pumping mechanism of the line. Pilot valve 59 and seat 53 may be reversed so that deenergizing solenoid "D" would cut off the escape of fluid.

In moving into closed position, seal 43 will freely enter the throat 21 by reason of its being in a contracted condition. When not subjected to fluid pressure, seal 43 contracts through inherent spring action. The closing of the valve is thus accompanied by a minimum of drag against the surface of throat 21 and the scoring of the seal and the valve seat is eliminated.

As the full pressure head of the now confined upstream body of fluid is developed in chamber 28, it will be transmitted through the transfer tube 49 to the interior of seal 43 in recess 40, inflating the seal and expanding it outwardly into tight sealing engagement with throat 21 and with the annular shoulder 41. Thus the valve is tightly closed with a hermetic seal which will be effective to hold the upstream pressure and prevent leakage of fluid into the outlet 14.

In the closed position of the valve, piston 22 will seat against shoulder 12 to establish a fixed limit of closing movement. In the fully open position of the valve, piston 22 will engage the end of skirt 18 and the valve head C will be withdrawn from the end member 13 of the housing sufficiently to provide an annular flow passage having a volume equally as great as that of passage 29 in sleeve 23. The faired contour of valve head C is such that eddy currents will be minimized and the flow resistance in this annular portion of the flow passage will not be substantially greater than in any other portion of the fluid line.

Fig. 4 illustrates a modified form of fluid energized seal, wherein a seal 43' has a flexible wall 67 constituting the valve seat and the valve head C' is rigid. The seal 43' is energized by fluid which enters the annular pressure chamber 40' through the valve opening 66 in the casing A' in the high pressure side of the line, and is trapped in the chamber 40' when the valve head C' engages the inner wall of the flexible flanged portion 67 of the seal. The fluid pressure contracts the wall 67 inwardly into tight sealing engagement with the rigid periphery of valve head C'. It will be obvious that in this arrangement, the valve head moves toward its seat from the downstream side.

I claim:

1. In a differential fluid pressure energized shut-off valve: a housing having an inlet and an outlet and including a cylinder of larger diameter than said inlet and outlet, an upstream end member joining said cylinder to said inlet, and a downstream end member joining said cylinder to said outlet and provided with a throat communicating with said outlet, said throat defining an internal valve seat; a piston unit including an annular piston slidable in said cylinder and a sleeve integral with said piston at the inner diameter thereof and in sliding telescoping connection with said inlet; a valve head carried by said piston unit, said valve head having an inflatable toroidal seal defining the periphery thereof, said seal being expansible to enlarge the diameter of its periphery in response to increase in fluid pressure therein, and being positioned for pressurized sealing contact of said periphery against said internal valve seat when thus expanded, said valve head being spaced from said piston unit to provide a valve opening fluid pressure chamber between the downstream side of said piston and said downstream end member of the housing; said sleeve interiorly defining a coaxial flow passage through said cylinder from said inlet to said valve opening chamber, the latter continuing said flow passage to said valve seat throat; said sleeve, cylinder, piston and upstream end member cooperatively defining an annular valve closing chamber on the upstream side of said piston; means providing a passage for escape of fluid from said valve closing chamber to said outlet, by-passing said flow passage, so as to establish a differential of pressure in said valve opening chamber over pressure in said valve closing chamber, to effect opening of said shut-off valve; a pilot valve for closing said escape passage; a bleed port in said sleeve through which upstream fluid pressure in said flow passage will enter said valve closing chamber to act on said piston to close the valve when said pilot valve is closed; and means defining a pressure fluid transfer passage extending between said valve closing chamber and said inflatable seal, whereby to expand said seal into said pressurized sealing contact with said seat in response to the action of fluid pressure in said valve closing chamber.

2. In a differential fluid pressure energized shut-off valve: a housing having an inlet, an outlet provided with a valve seating throat, and a cylinder in communication with said inlet; a piston slidable in said cylinder; a valve head carried by said piston, said valve head having an inflatable toroidal seal defining the periphery thereof, said seal being adapted for fluid pressure expansion into valve closing contact with said throat; means in said housing defining a flow passage extending from said inlet past said piston to said outlet and adapted to be closed by the seating of said valve; said housing and piston including means defining a valve closing fluid pressure chamber on the upstream side of said piston and means defining a valve opening fluid pressure chamber on the downstream side of said piston; means providing a passage for escape of fluid from said valve closing chamber through said outlet, by-passing said flow passage so as to establish a differential of pressure in said valve opening chamber over pressure in said valve closing chamber to effect opening of said valve; a pilot valve for closing said escape passage; means providing a bleed connection between said inlet and said valve closing chamber through which upstream fluid pressure may enter said valve closing chamber to act on said piston to close the shut-off valve when said pilot valve is closed; and means defining a pressure fluid transfer passage extending between said valve closing chamber and said inflatable seal for expanding said seal into pressurized sealing contact with said throat in response to an increase in fluid pressure in said valve closing chamber upon arrival of said valve head at the closed position.

3. In a differential fluid pressure energized shut-off valve: a housing having an inlet, an outlet provided with a valve seat, and a cylinder in communication with said inlet; a piston slidable in said cylinder; a valve head carried by said piston, said valve head having an inflatable seal adapted for fluid pressure expansion into valve closing contact with said valve seat; means in said housing defining a flow passage extending from said inlet past said piston to said outlet and adapted to be closed by the seating of said valve; said housing and piston including means defining a valve closing fluid pressure chamber on the upstream side of said piston and means defining a valve opening fluid pressure chamber on the downstream side of said piston; means providing a passage for escape of fluid from said valve closing chamber through said outlet, bypassing said flow passage, so as to establish a differential of pressure in said valve opening chamber over pressure in said valve closing chamber to effect opening of said shut-off valve; a pilot valve for closing said escape passage; means providing a bleed connection between said inlet and said valve closing chamber through which upstream fluid pressure may enter said valve closing chamber to act on said piston to close the valve when said pilot valve is closed; and means defining a pressure fluid transfer passage extending between said valve closing chamber and said inflatable seal for expanding said seal into pressurized sealing contact with said valve seat in response to an increase in fluid pressure in said valve closing chamber upon arrival of said valve head at the closed position.

4. In a differential fluid pressure energized shut-off valve: a housing having an inlet, an outlet provided with a valve seat and a cylinder in communication with said inlet; a piston slidable in said cylinder; a valve head carried by said piston, said valve head having a fluid pressure responsive seal adapted for fluid pressure energized distension into valve closing contact with said seat; means in said housing defining a flow passage extending from said inlet past said piston to said outlet and adapted to be closed by the seating of said valve; said housing and piston including means defining a valve closing fluid pressure chamber on the upstream side of said piston and means defining a valve opening fluid pressure chamber on the downstream side of said piston; means providing a passage for escape of fluid from said valve closing chamber to said outlet, by-passing said flow passage so as to establish a differential of pressure in said valve opening chamber over pressure in said valve closing chamber to effect opening of said valve; a pilot valve for closing said escape passage; means providing a bleed connection between said inlet and said valve closing chamber through which upstream fluid pressure may enter said valve closing chamber to act on said piston to close the shut-off valve when said pilot valve is closed; and means defining a pressure fluid transfer passage extending between said valve closing chamber and said fluid pressure responsive seal for distending said seal into pressurized sealing contact with said seat in response to an increase in fluid pressure in said valve closing chamber.

5. In a differential fluid pressure energized shut-off valve: a housing having an inlet, an outlet provided with a valve seat, and a cylinder in communication with said inlet; a piston slidable in said cylinder; a valve head carried by said piston for valve closing contact with said seat; fluid pressure responsive seal means for establishing a pneumatic seal between said valve head and seat when subjected to fluid pressure; means in said housing defining a flow passage extending from said inlet past said piston to said outlet and adapted to be closed by the seating of said valve; said housing and piston including means defining a valve closing fluid pressure chamber on the upstream side of said piston and means defining a valve opening fluid pressure chamber on the downstream side of said piston; means providing a passage for escape of fluid from said valve closing chamber through said outlet, by-passing said flow passage so as to establish a differential of pressure in said valve opening chamber over pressure in said valve closing chamber to effect opening of said valve; a pilot valve for closing said escape passage; means providing a bleed connection between said inlet and said valve closing chamber through which upstream fluid pressure may enter said valve closing chamber to act on said piston to close the shut-off valve when said pilot is closed; means defining a pressure fluid transfer passage extending between said valve closing chamber and said pressure responsive seal for distending said seal into pressurized sealing contact with said seat in response to an increase in fluid pressure in said valve closing chamber; and a solenoid for operating said pilot valve.

6. In a differential fluid pressure energized shut-off valve; a housing having an inlet and an outlet and including a cylinder of larger diameter than said inlet and outlet, an upstream end member joining said cylinder to said inlet, and a downstream end member joining said cylinder to said outlet and provided with a throat communicating with said outlet, said throat defining an internal valve seat; a piston unit including an annular piston slidable in said cylinder and a sleeve integral with said piston at the inner diameter thereof and in sliding telescoping connection with said inlet; a valve head carried by said piston unit, said valve head having an inflatable toroidal seal defining the periphery thereof, said seal being expansible to enlarge the diameter of its periphery in response to increase in fluid pressure therein, and being positioned for pressurized sealing contact of said periphery against said internal valve seat when thus expanded, said valve head being spaced from said piston unit to provide a valve opening fluid pressure chamber between the downstream side of said piston and said downstream end member of the housing; said sleeve interiorly defining a coaxial flow passage through said cylinder from said inlet to said valve opening chamber, the latter continuing said flow passage to said valve seat throat; said sleeve, cylinder, piston and upstream end member cooperatively defining an annular valve closing chamber on the upstream side of said piston; means providing a passage for escape of fluid from said valve closing chamber to said outlet, by-passing said flow passage, so as to establish a differential of pressure in said valve opening chamber over pressure in said valve closing chamber, to effect opening of said shut-off valve; a pilot valve for closing said escape passage; a bleed port in said sleeve through which upstream fluid pressure in said flow passage will enter said valve closing chamber to act on said piston to close the valve when said pilot valve is closed; and means rendering said expansible seal responsive to an increase in fluid pressure in said valve closing chamber upon arrival of said valve head at the closed position, to expand said seal into said pressurized sealing contact with said seat.

7. In a differential fluid pressure energized shut-off valve: a housing having an inlet and an outlet and including a cylinder of larger diameter than said inlet and outlet, an upstream end member joining said cylinder to said inlet, and a downstream end member joining said cylinder to said outlet and provided with a valve seat, said cylinder having at one side a mounting face; a piston unit including an annular piston slidable in said cylinder and a sleeve integral with said piston at the inner diameter thereof and in sliding telescoping connection with said inlet; a valve head carried by said piston and adapted for valve closing engagement with said seat, a valve opening fluid pressure chamber being defined between the downstream side of said piston and said downstream end member of the housing; said sleeve interiorly defining a coaxial flow passage through said cylinder from said inlet to said valve opening chamber, the latter continuing said flow passage to said valve seat; said sleeve, cylinder, piston and upstream end member cooperatively defining an annular valve closing chamber on the upstream side of said piston; means providing a passage for escape of fluid from said valve closing chamber to said outlet, by-passing said flow passage so as to establish a differential of pressure in said valve opening chamber over pressure in said valve closing chamber, to effect opening of said shut-off valve, said last means comprising a pilot valve casing having an attachment face attached to said mounting face and having a pilot valve chamber, a pilot valve seat at one end of said chamber, an inlet passage leading to said valve seat and an outlet passage leading away from said pilot valve chamber, said inlet and outlet passages extending in spaced relation to said attachment face; a pressure port in said cylinder, extending from said valve closing chamber to said mounting face and communicating with said inlet passage; a check valve chamber in said mounting face in communication with said outlet passage at said attachment face; a check valve disc in said check valve chamber, adapted to seat against said attachment face to close said outlet passage against any excess of fluid pressure in said valve closing chamber; a valve poppet in said pilot valve chamber, having a stem; a solenoid attached to said pilot valve casing and connected to said stem to move said pilot valve poppet to closed position when closed, and a discharge tube extending from said check valve chamber to said valve outlet, externally of said housing, said housing having a pressure port connecting said valve closing chamber to said pilot valve inlet passage, the closing of said pilot valve functioning to close said escape passage so as to effect a build up of pressure in said valve closing chamber; and a bleed port in said sleeve through which upstream fluid pressure in said flow passage will enter said valve closing chamber to act on said piston to close the valve when said pilot valve is closed.

8. In a fluid pressure energized shut-off valve; a housing having an inlet and an outlet and including a cylinder of larger diameter than said inlet and outlet and coaxial therewith, and an annular frusto conical valve seat throat at said outlet; a piston unit slidable in said cylinder; a valve head carried by said piston unit, said valve head including a pair of generally conical sheet metal shells, a pair of mounting rings to which the base ends of said shells are secured and sealed, one of said rings having a neck threaded into the other ring for detachably securing them together, said rings having axially spaced peripheral portions defining an annular recess between them; and a semi-toroidal seal ring of thin spring sheet metal in said recess, having one side clamped between said mounting rings and an opposite side in expansion-limiting engagement with the peripheral portion of one of said rings and yieldable radially inwardly upon engagement within said frusto conical valve seat throat; said seal closing the periphery of said annular recess so as to define with said mounting rings a seal-expanding fluid pressure chamber; means including said housing defining a valve closing fluid pressure chamber on the upstream side of said piston; and means defining a fluid passage extending from said valve closing chamber to said seal-expanding chamber.

9. In a fluid pressure energized shut-off valve; a housing having an inlet and an outlet and including a cylinder of larger diameter than said inlet and outlet and coaxial therewith, an annular frusto conical throat at said outlet; a piston unit slidable in said cylinder; a valve head carried by said piston unit, said valve head including a pair of detachably connected mounting rings having axially spaced peripheral portions defining an annular recess between them; and a semi-toroidal expansible seal ring secured between said mounting rings and closing the periphery of said annular recess so as to define with said mounting rings a seal-expanding fluid pressure chamber, said ring being adapted for fluid expanded sealing engagement in said throat and yieldable radially inwardly upon engagement with said throat; means including said housing defining a valve closing fluid pressure chamber on the upstream side of said piston; and means defining a fluid passage extending from said valve closing chamber to said seal expanding chamber.

References Cited in the file of this patent
UNITED STATES PATENTS

| | | |
|---|---|---|
| 612,890 | Wood | Oct. 25, 1898 |
| 2,059,656 | Ring | Nov. 3, 1936 |
| 2,799,466 | Hickerson | July 16, 1957 |